3,647,770
PROCESS FOR FORMATION OF A CYCLIZED ACRYLIC FIBROUS MATERIAL
Klaus H. Gump, Gillette, and Dagobert E. Stuetz, Westfield, N.J., assignors to Celanese Corporation, New York, N.Y.
No Drawing. Filed Nov. 21, 1968, Ser. No. 777,902
Int. Cl. C08f 3/76, 15/02; D01f 7/02
U.S. Cl. 260—85.5 S                                 11 Claims

ABSTRACT OF THE DISCLOSURE

An improved process is provided for the formation of fibrous materials of enhanced thermal stability derived from acrylic polymers consisting primarily of recurring acrylonitrile units. A minor quantity of a Lewis acid capable of promoting the cyclization of pendant nitrile groups is incorporated in a solution of the acrylic polymer and a cyclized acrylic material is formed therein which is subsequently spun into a fiber which exhibits no appreciable exothermic reaction when heated to 500° C. Upon subjecting the resulting fiber to relatively mild preoxidation conditions a stabilized fibrous material may be formed which optionally may be carbonized or carbonized and graphitized at elevated temperatures while present in an inert atmosphere.

BACKGROUND OF INVENTION

In the past procedures have been proposed for the conversion of fibers formed from acrylic polymers to a modified form possessing enhanced thermal stability. Such modification has generally been accomplished by heating the fibrous material in an oxygen containing atmosphere, such as ordinary air, at moderate temperatures for extended periods of time. The resulting product may be suitable for use as an intermediate in the formation of carbonized fibrous materials, or for direct utilization as a fire resistant fiber. U.S. Pat. Nos. 2,913,802 to Barnett and 3,285,696 to Tsunoda disclose processes for the conversion of fibers of acrylonitrile homopolymers or copolymers to a heat resistant form. Such prior art stabilization techniques have commonly been directed to batch operations employing acrylontrile copolymers. Belgian Pat. No. 700,655 discloses a procedure whereby a continuous length of an acrylonitrile copolymer may be continuously subjected to a preoxidation treatment to produce essentially complete oxygen saturation while maintained in air at a temperature not exceeding 250° C., e.g., three hours or more at 220° C. Belgian Pat. No. 678,679 and French Pat. No. 1,471,993 disclose conducting the complete stabilization process in an inert atmosphere. U.S. Pat. No. 3,242,000 to Lynch discloses a carbonization process in which an acrylic fiber is sprayed or padded with a solution of a compound having a refractory metal cation, and carbonized at 300° C. to 3000° C. in an atmosphere containing at least some oxygen thereby converting the compound to an inert oxide which serves as a barrier coating.

The stabilization of fibers of acrylonitrile homopolymers and copolymers in an oxygen containing atmosphere involves (1) an oxidative cross-linking reaction of adjoining molecules as well as (2) a cyclization reaction of pendant nitrile groups to a condensed dihydropyridine structure. While the reaction mechanism is complex and not readily explainable, it is believed that these two reactions occur concurrently according to the prior art, or are to some extent competing reactions.

The cyclization reaction is exothermic in nature and must be controlled if the fibrous configuration of the acrylic polymer undergoing stabilization is to be preserved. As indicated, prior art techniques have commonly overcome this difficulty by heating the fiber in an oxygen containing atmosphere at moderate temperatures generally extended over many hours.

It is an object of the invention to provide an improved process for the formation of an inexpensive fibrous material which exhibits enhanced thermal stability and is derived from an acrylic polymer.

It is an object of the invention to provide an improved process for the formation of a fibrous material derived from an acrylic polymer which involves the chemical catalysis of the cyclization reaction.

It is an object of the invention to provide an improved process for the formation of flame-proof fibrous materials derived from acrylic polymers.

It is an object of the invention to provide acrylic fibrous materials of increased thermal stability which exhibit an enhanced molecular structure.

It is another object of the invention to provide an improved process for the formation of stabiilzed fibrous materials derived from acrylic polymers which results in a product which is suitable for carbonization, or carbonization and graphitization.

It is an object of the invention to provide a fiber derived from an acrylic polymer which retains desirable textile properties when used at elevated temperatures, e.g. strength, ductility, stiffness, and abrasion resistance at temperatures as high as 500° C.

It is an object of the invention to provide a carbonized or carbonized and graphitized fibrous material possessing superior durability, strength, and stiffness which is derived from an acrylic polymer.

These and other objects, as well as the scope, nature and utilization of the invention will be apparent from the following detailed description and appended claims.

Summary of the invention

It has been found that a process for the formation of a cyclized acrylic fibrous material comprises forming a solution of (a) an acrylic polymer consisting primarily of recurring acrylonitrile units, (b) a minor quantity of a Lewis acid capable of promoting the cyclization of pendant nitrile groups and (c) a solvent for the acrylic polymer and the Lewis acid; maintaining the solution at a temperature below about 190° C. until a cyclized acrylic material is formed therein in the absence of an appreciable increase in the viscosity of said solution; and spinning the solution to form a cyclized acrylic fibrous material which is soluble in N,N-dimethylformamide and exhibits no appreciable exothermic reaction when heated to 500° C. Upon heating at relatively mild temperatures in an oxygen containing atmosphere the cyclized material may be converted to a stabilized form which is insoluble in N,N-dimethylformamide. The stabilized material may be optionally carbonized or graphitized by heating in an inert atmosphere at elevated temperatures. Alternatively, the cyclized or stabilized materials may be utilized directly in applications where a fiber of enhanced thermal stability is required.

Detailed description of the invention

It has been observed that the oxidative cross-linking and the cyclization reactions referred to above which simultaneously occur in the prior art when the acrylic fibrous material is heated in an oxygen containing atmosphere commonly may result in an undesirable fragmentation of the polymer chains. It has now been established that the cyclization reaction may be efficiently conducted prior to spinning while the acrylic polymer is dissolved in a suitable solvent for the same. The cyclization reaction which occurs in the present process is catalytically promoted by certain Lewis acids dissolved in the solvent as discussed in detail hereafter. Also, the rate of oxidation is advantageously increased following spinning should the cyclized acrylic fibrous material be heated in an oxygen containing atmosphere at moderate temperatures.

The acrylic polymer which is utilized in the present process is formed either (1) entirely of recurring acrylonitrile units, or (2) of recurring acrylonitrile units copolymerized with a minor proportion of one or more monovinyl units to produce a copolymer exhibiting properties substantially similar to an acrylonitrile homopolymer. Acrylonitrile homopolymers are particularly preferred for use in the present process. Suitable copolymer materials commonly contain at least about 85 mol percent of recurring acrylonitrile units and up to about 15 mol percent of one or more monovinyl units copolymerized therewith. The preferred acrylonitrile copolymers contain at least about 95 mol percent of acrylonitrile units and up to about 5 mol percent of one or more monovinyl units copolymerized therewith. Suitable monovinyl units include styrene, methyl acrylate, methyl methacrylate, vinyl acetate, vinyl chloride, vinylidene chloride, vinyl pyridine, and the like, or a plurality of such monomers.

As indicated below, the Lewis acid for use in the process may be either sulfur trioxide or a Lewis acid of the metal halide type. Suitable Lewis acids for use in the process of the invention include stannous chloride ($SnCl_2$), stannic chloride ($SnCl_4$), boron fluoride ($BF_3$), sulfur trioxide ($SO_3$), ferric chloride ($FeCl_3$), titanium tetrachloride ($CiCl_4$), aluminum chloride ($AlCl_3$), and indium dichloride ($InCl_2$). The preferred Lewis acid for use in the present invention is stannic chloride. Lewis acids are selected which are incapable of decomposing the acrylic polymer. The high present cost of indium dichloride militates against its selection.

In a preferred embodiment of the invention the Lewis acid is present in the form of a complex formed with nucleophilic reagents such as ethers, amides, or tertiary amines. These complexes tend to be hydrolytically and thermally more stable than the parent Lewis acids and offer significant handling advantages particularly when the Lewis acid is normally a gas or liquid. The particularly preferred complex forming base is N,N-dimethylformamide. Suitable complexes may be formed by dissolving the Lewis acid in a solvent, e.g. dry chloroform, and incrementally adding an excess of the complex forming base with stirring. A complex forms as a preciiptate which may be isolated by filtration, washed, and dried. The ratio of Lewis acid to base in the complex is dependent upon the stoichiometric composition of the acid-base complex. For instance, $BF_3$ forms a 1:1 complex with ethers. The particularly preferred complex contains one mol stannic chloride per two mols of N,N-dimethylformamide.

Suitable solvents which may be utilized in the present process are capable of dissolving both the acrylic polymer and the Lewis acid without decomposing either component. Examples of suitable organic solvents include N,N-dimethylformamide, butyrolactone, dimethylacetamide, etc. The preferred solvents are those which are commonly utilized during the spinning of fibers from acrylonitrile homopolymers and copolymers. The particularly preferred solvent is N,N-dimethylformamide. The solvent must be essentially anhydrous to avoid gradual deactivation of the Lewis acid by hydrolysis. It is, therefore, preferred to dry the solvent by running it through a bed of drying agent (e.g. Linde sieves, activated alumina, etc.), and to exclude atmospheric moisture by blanketing with dry air or nitrogen.

The solution of acrylic polymer and Lewis acid utilized in the process may be formed in any convenient manner. For instance, the acrylic polymer and the Lewis acid may be added to the solvent, and stirred until a homogeneous solution results. Alternatively, the Lewis acid may be added incrementally to a solution of the acrylic polymer during the cyclization reaction described in detail hereafter.

The concentration of acrylic polymer in the solvent may be varied widely, e.g. from about 5 to about 30 percent by weight based on the weight of the solvent. It is preferred, however, that the acrylic polymer be present therein in a concentration which is convenient for spinning without the need to adjust prior to spinning the concentration of the cyclized acrylic material ultimately produced. Preferred concentrations range from 10 to 25 percent acrylic polymer by weight based on the weight of the solvent. The cyclized acrylic polymers resulting from such preferred concentrations can generally be readily spun.

The Lewis acid is present in the solution in a minor concentration, i.e. about 0.1 to about 10 percent by weight based on the weight of the acrylic polymer. In a preferred embodiment of the invention the Lewis acid is present in a concentration of about 1 to about 5 percent by weight based on the weight of the acrylic polymer. When the Lewis acid is introduced in complex form, the quantity of Lewis acid present is calculated by reference solely to the Lewis acid portion of the complex.

The solution comprising (a) an acrylic polymer consisting primarily of recurring acrylonitrile units, (b) a minor quantity of a Lewis acid capable of promoting the cyclization of pendant nitrile groups, and (c) a solvent for the acrylic polymer and the Lewis acid is maintained at a temperature below about 190° C. until a cyclized acrylic material is formed therein in the absence of an appreciable increase in the viscosity of the solution.

It has been found that if the solution is maintained at a temperature below about 190° C., then the cyclization reaction may occur as an initial discrete step, and is followed by an irreversible gelation reaction. Infrared analyses indicate that the resulting cyclized acrylic material contains only a very small residual amount of the pendant —C≡N groups of the starting material which appear at 4.47μ. Instead, —C=N— groups are detected at 6.3μ. Analyses of samples taken at various time intervals during the initial reaction indicate a decrease of —C≡N groups, and a corresponding increase of —C=N— groups confirming that the major reaction is one of cyclization. If isolated prior to the onset of the gelation reaction, the cyclized acrylic material is readily soluble in solvents such as N,N-dimethylformamide.

The resulting cyclized acrylic material exhibits no appreciable exothermic reaction (i.e. less than 25 percent and preferably less than 10 percent of the magnitude exhibited by the unmodified acrylic polymer) when heated in air to about 500° C. as determined by differential scanning calorimeter techniques. The exothermic nature of the cyclization reaction commonly leads to the destruction of the fibrous configuration of an untreated acrylic material at a temperature generally not in excess of about 300° C. to 330° C. in air.

It is essential that a fibrous material be spun from the solution containing the cyclized acrylic material prior to the point in time that an irreversible gelation reaction occurs as evidenced by a rapid increase in the viscosity of the solution. The gelation reaction is believed to be essentially a cross-linking reaction and results in a rapid transition of the free-flowing solution to a viscous or nonflowing form. Immediately following gelation the material is partially or completely insoluble in N,N-dimethylformamide and is incapable of being spun into a fiber by conventional techniques.

The conditions under which the cyclized product is formed are selected so that the gelation reaction does not occur prior to the spinning of the cyclized acrylic fibrous material. The two most important parameters which influence the onset of the gelation reaction are (1) the temperature of the solution, and (2) the concentration of the acrylic polymer in the solution. The duration of the time interval prior to the commencement of the gelation reaction decreases with both solution temperature and the concentration of the acrylic polymer in the solution.

If the solution is elevated to a temperature above about 190° C., then the gelation reaction tends to occur spontaneously regardless of the concentration of the acrylic polymer in the solution. It is accordingly preferred that the solution be maintained at a temperature of about 100° C. to about 180° C. during the cyclization portion of the process. In a particularly preferred embodiment of the invention the temperature of the solution is maintained at about 140° C. to about 160° C. during the cyclization portion of the process. It is recommended that the temperature selected be below that of the boiling point of the solvent for the acrylic polymer and the Lewis acid. The period of time which elapses under various cyclization reaction conditions prior to the onset of the gelation reaction may be readily determined by control experiments.

Throughout the cyclization reaction the solution tends to be light yellow to brown in appearance. The color tends to vary with the specific Lewis acid selected. However, a color change to red-brown is indicative of the approximate onset of the irreversible gelation reaction.

Tables I, II and III indicate the change in viscosity of acrylonitrile homopolymer solutions of various concentrations when the cyclization and gelation reactions are conducted at selected temperatures. In each instance the Lewis acid present in the solution was in the form of a stannic chloride-dimethylformamide complex containing one mol stannic chloride per each two mols of N,N-dimethylformamide, and was present in concentration of one percent by weight based on the weight of the acrylonitrile homopolymer. The solvent utilized at the reaction temperature of 140° C. was N,N-dimethylformamide. The solvent utilized at the other reaction temperatures indicated in the tables was butyrolactone.

In the reactions summarized in Table I the acrylonitrile homopolymer was present in concentration of 5 percent by weight based on the weight of the solvent. The gelation reaction began after 175 minutes at 140° C., after 150 minutes at 160° C., and after 30 minutes at 180° C.

TABLE I

| | Reaction time in minutes | Viscosity in centipoises | Color of solution |
|---|---|---|---|
| Reaction temperature: | | | |
| 140° C | 0 | 60 | Light bellow. |
| | 50 | 60 | Brown. |
| | 100 | 60 | Do. |
| | 150 | 60 | Do. |
| | 200 | 94 | Red brown. |
| | 250 | 190 | Do. |
| | 300 | 370 | Do. |
| | 350 | 800 | Do. |
| 160° C | 0 | 150 | Light yellow. |
| | 50 | 150 | Brown. |
| | 100 | 150 | Do. |
| | 150 | 270 | Do. |
| | 200 | 3,400 | Red brown. |
| | 220 | 9,600 | Do. |
| 180° C | 0 | 80 | Light yellow. |
| | 20 | 80 | Brown. |
| | 40 | 100 | Do. |
| | 60 | 800 | Red brown. |
| | 70 | 1,900 | Do. |
| | 80 | 5,400 | Do. |

In the reactions summarized in Table II the acrylonitrile homopolymer was present in a concentration of 10 percent by weight based on the weight of the solvent. The gelation reaction began after 130 minutes at 140° C., after 75 minutes at 160° C., and after 13 minutes at 180° C.

TABLE II

| | Reaction time in minutes | Viscosity in centipoises | Color of solution |
|---|---|---|---|
| Reaction temperature: | | | |
| 140° C | 0 | 330 | Light yellow. |
| | 50 | 330 | Brown. |
| | 100 | 330 | Do. |
| | 150 | 460 | Red brown. |
| | 200 | 930 | Do. |
| | 250 | 1,800 | Do. |
| | 300 | 3,900 | Do. |
| 160° C | 0 | 950 | Light yellow. |
| | 50 | 950 | Brown. |
| | 75 | 1,020 | Red brown. |
| | 100 | 4,300 | Do. |
| | 125 | 17,000 | Do. |
| 180° C | 0 | 600 | Light yellow. |
| | 10 | 600 | Brown. |
| | 20 | 750 | Red brown. |
| | 30 | 2,070 | Do. |
| | 40 | 6,400 | Do. |
| | 50 | 19,000 | Do. |

In the reactions summarized in Table III the acrylonitrile homopolymer was present in a concentration of 15 percent by weight based on the weight of the solvent. The gelation reaction began after 100 minutes at 140° C., after 40 minutes at 15° C., and after 8 minutes at 180° C.

TABLE III

| | Reaction time in minutes | Viscosity in centipoises | Color of solution |
|---|---|---|---|
| Reaction temperature: | | | |
| 140° C | 0 | 1,200 | Light yellow. |
| | 50 | 1,200 | Brown. |
| | 100 | 2,100 | Red brown. |
| | 150 | 2,700 | Do. |
| | 200 | 6,600 | Do. |
| | 250 | 15,000 | Do. |
| | 300 | 36,000 | Do. |
| 155° C | 0 | 8,000 | Light yellow. |
| | 25 | 8,000 | Brown. |
| | 50 | 11,000 | Red brown. |
| | 75 | 28,000 | Do. |
| | 100 | 85,000 | Do. |
| 180° C | 0 | 3,200 | Light yellow. |
| | 5 | 3,200 | Brown. |
| | 10 | 4,500 | Red brown. |
| | 15 | 7,400 | Do. |
| | 20 | 13,000 | Do. |
| | 25 | 27,000 | Do. |

If one utilizes greater acrylic polymer concentrations within the Lewis acid containing solution, progressively shorter periods of time tend to elapse prior to the onset of the gelation reaction. Immediately following formation of the cyclized acrylic material a portion of the solvent may be removed, such as by evaporation techniques, to form a more concentrated solution which may be more conveniently spun. Conversely, additional solvent optionally may be added to form a more dilute spinning solution.

The cyclized acrylic material is spun into a cyclized acrylic fibrous material prior to the gelation reaction by conventional techniques which are well known to those skilled in the art. For instance, dry spinning or wet spinning techniques may be employed. The cyclized acrylic material should generally be present in the solvent in a concentration of about 10 to about 25 percent by weight based on the weight of the solvent for efficient spinning. If desired, additional cyclization of a partially cyclized acrylic material may be carried out during the spinning step of the process. The resulting fibrous material may be washed and dried by conventional techniques.

The cyclized acrylic fibrous materials formed according to the invention may assume any one of a variety of configurations. For instance, the fibrous materials may be continuous single filaments, continuous multifilament yarns, staple fibers, tows, ropes, tapes, knits, braids, fabrics, or other fibrous assemblages. In a preferred embodiment of the invention the cyclized acrylic fibrous material is a continuous multifilament yarn. The yarn may optionally be provided with a twist which improves its handling characteristics. For example, a twist of about 0.1 to 3 t.p.i., and preferably about 0.1 to 1.0 t.p.i may be utilized Larger yarn bundles or other fibrous assemblages may generally be formed by plying (1) after spinning, or (2) following the optional preoxidation treatment described in detail hereafter.

Continuous lengths of the stabilized acrylic fibrous material are preferably oriented to improve their physical properties by conventional techniques. For instance, a single filament, a continuous multifilament yarn, or a tape may be oriented by hot drawing over a heated shoe at a draw ratio of about 3:1 to about 7:1. Steam drawing may also be utilized.

The resulting cyclized acrylic fibrous material is soluble in N,N-dimethylformamide, and exhibits no appreciable exothermic reaction when heated to 500° C. The fibrous material commonly contains a bound oxygen content of up to about three percent by weight as determined by the Unterzaucher analysis. Upon subjection to an ordinary match flame the cyclized acrylic fibrous material will burn.

The cyclized acrylic fibrous material may next be heated at relatively mild preoxidation temperatures in an oxygen containing atmosphere to form a stabilized fibrous product which is capable of undergoing carbonization, insoluble in N,N-dimethylformamide, exhibits no exothermic reaction when heated to 500° C., retains its original fibrous configuration essentially intact, and is non-burning when subjected to an ordinary match flame. During such heat treatment an oxidative cross-linking reaction is believed to occur between the adjoining molecules of the cyclized acrylic fibrous material. If desired, the optional preoxidation treatment may be combined with a fiber drawing procedure in which improved orientation is imparted.

In a preferred embodiment of the invention the cyclized acrylic fibrous material is heated in an oxygen containing atmosphere maintained at about 200° C. to about 400° C. (preferably about 250° C. to about 350° C.). The oxygen containing atmosphere commonly contains about 5 to 75 percent oxygen by weight. Air may conveniently be used as the oxygen containing atmosphere. The time required to complete the stabilization treatment in an oxygen containing atmosphere is inversely related, but not necessarily proportional, to the temperature to which the cyclized acrylic fibrous material is subjected. For instance, if the temperature of the oxygen containing atmosphere is about 200° C. to 400° C., heating times commonly range from about 30 minutes to 10 minutes. The duration of the exposure of the cyclized acrylic fibrous material to an oxygen containing atmosphere is also influenced in some degree by the concentration of oxygen present within the atmosphere. At the completion of the heat treatment in an oxygen containing atmosphere the stabilized fibrous material is lustrous black in appearance. A total bound oxygen content of at least about 7 percent by weight is preferably achieved during the optional preoxidation step of the process. A bound oxygen content of 7 to 15 percent by weight is commonly produced. Higher oxygen contents tend to require extended residence times, and generally yield no commensurate advantage.

The preoxidation treatment of the present invention yields a stabilized fibrous material which may be carbonized or carbonized and graphitized in an inert atmosphere. Carbonization temperatures ranging from about 900° C. to 3000° C. may be employed for about 3 seconds to about 5 minutes. The carbonization step may generally follow immediately after the preoxidation step previously described without the necessity to use an intermediate heating schedule. During the carbonization reaction elements present in the stabilized fibrous material other than carbon, e.g. nitrogen, hydrogen and oxygen, are expelled. The term "carbonized product" as used herein is defined to be a product consisting of at least about 90 percent carbon by weight, and preferably at least about 95 percent carbon by weight. Graphitic carbon may or may not be present in the same. Suitable inert or non-oxidizing atmospheres in which the carbonization step may be conducted include nitrogen, argon, helium, hydrogen, etc.

A carbonzed product including substantial amounts of graphitic carbon results if the temperature is more severe, e.g. about 2000° C. to about 3000° C. A graphitized product may generally be formed in about 5 seconds to about 2 minutes. The presence of graphitic carbon may be detected by the characteristic X-ray diffraction pattern of graphite. In a particularly preferred embodiment of the invention a graphitized product is formed by heating the carbonized fibrous material at a temperature of about 2900° C. for at least about 5 seconds, e.g. about 5 to 60 seconds. By varying the temperature the properties of the resulting product may be varied. For instance, the modulus of the carbonized product tends to increase with increasing temperatures, while the tensile strength tends to remain constant for all temperatures above about 1400° C. provided the fiber is not damaged by handling or thermal shock.

The equipment utilized to carry out the process of the invention may be varied widely as will be apparent to those skilled in the art.

The preoxidation treatment of the cyclized acrylic fibrous material may be conducted on either a batch or a continuous basis. During this stabilization treatment the cyclized fibrous material may be placed in or continuously passed through a circulating oven, or the tube of a muffle furnace while in contact with the requisite atmosphere. In a continuous operation a continuous length of the fibrous material may be optionally passed through the heating zone for a plurality of passes until the desired residence time is achieved.

The carbonization or carbonization and graphitization treatment may be conducted in any apparatus capable of producing the required temperatures while excluding the presence of an oxidizing atmosphere. For instance, suitable apparatus include induction furnaces, tube furnaces in which a hollow graphite susceptor is heated by direct resistance heating, direct resistance heating apparatus in which electric current is passed through the fibrous material, apparatus capable of producing reducing flames, electric arc furnaces, thermal image equipment such as solar furnaces, low temperature plasma flames, lasers, etc. When an induction furnace is utilized, the stabilized fibrous material may be passed through a graphite tube or shroud which is situated within the windings of an induction coil.

The following examples are given as specific illustrations of the invention. It should be understood, however, that the invention is not limited to the specific details set forth in the examples.

Example I

Stannic chloride ($SnCl_4$) was dissolved in dry chloroform in a concentration of 0.4 mol per liter and cooled to 0° C. N,N-dimethylformamide was added dropwise to the stannic chloride solution with stirring to a concentration of 1.2 mols of N,N-dimethylformamide per liter of chloroform. A white precipitate of stannic chloride-dimethylformamide complex formed in which 2 mols of N,N-dimethylformamide were combined with each mol of stannic chloride. The complex was isolated by filtration, washed three times with chloroform, and dried.

A solution was formed using essentially anhydrous N,N-dimethylformamide as solvent which contained 15 percent by weight of acrylonitrile homopolymer based on the weight of the solvent. The solution was heated to 140° C. and the stannic chloride-dimethylformamide complex was added with stirring in a concentration sufficient to form a 5 weight percent solution of stannic chloride based on the weight of the acrylic polymer. Atmospheric moisture was excluded by blanketing with nitrogen.

Following the addition of the complex the resulting solution was maintained at 140° C. for 90 minutes in the absence of an appreciable increase in viscosity. The solution was next cooled at room temperature and wet spun into a bath containing 7 parts by weight chloroform and 3 parts by weight N,N-dimethylformamide to form a continuous multi-filament yarn. The yarn was washed in water and dried. The yarn was next drawn over a hot shoe maintained at 135° C. at a draw ratio of 6:1.

The resulting yarn was red in appearance, substantially free of exotherm when heated to about 500° C., and essentially free of unreacted —C≡N groups. The cyclization reaction was confirmed by the increasing presence of —C=N— groups during the treatment as determined by infrared analysis. The yarn was soluble in N,N-dimethylformamide, and burned when subjected to an ordinary match flame.

Example II

Example I was repeated with the exception that the Lewis acid was added to the solution in the form of particulate stannous chloride. Substantially similar results were obtained with the exception that the resulting yarn was light yellow in appearance.

Example III

Example I was repeated with the exception that the Lewis acid was added to the solution in the form of a boron fluoride-dimethylformamide complex which was formed by the combination of 1 mol of N,N-dimethylformamide with each mol of boron fluoride. Substantially similar results were obtained with the exception that the resulting yarn was yellow in appearance.

Example IV

A Lindburg muffle furnace having a tube diameter of 2 inches and a length of 72 inches was utilized to stabilize in an air atmosphere the yarns formed in accordance with Examples I, II and III. The yarns were continuously passed over rollers situated at each end of the furnace and suspended along the axial center of the tube furnace for a total residence time of 30 minutes at 300° C. The resulting stabilized fibrous materials were black in appearance, insoluble in N,N-dimethylformamide, exhibited no exothermic reaction when heated to 500° C., retained their original fibrous configurations essentially intact, and were non-burning when subjected to an ordinary match flame.

Example V

The stabilized yarns produced in accordance with Example IV may be next continuously introduced and withdrawn from a Lepel 450 kc. induction furnace in order to carbonize and graphitize the same where the yarns are heated to a maximum temperature of approximately 2900° C. for a total residence time of 40 seconds. The induction furnace may comprise a 10 turn water cooled copper coil having an inner diameter of ¾ inch and a length of 2 inches, a 20 kw. power source, and be equipped with a hollow graphite tube suspended within the coil of the same having a length of 8½ inches, an outer diameter of ½ inch and an inner diameter of ⅛ inch through which the previously stabilized yarns are continuously passed. The copper coil which encompasses a portion of the hollow graphite tube may be positioned at a location essentially equidistant from the respective ends of the graphite tube. An inert atmosphere of nitrogen is maintained within the induction furnace. The graphitized product is composed of essentially pure carbon, and exhibits satisfactory physical properties, such as tenacity and modulus.

The cyclized acrylic fibrous materials which are soluble in N,N-dimethylformamide formed in accordance with the present invention as suitable for use in applications where a fibrous material capable of withstanding temperatures of at least 500° C. are required. For instance, thermally resistant fabrics may be formed from the same. The stabilized acrylic fibrous materials formed according to the present invention which are insoluble in N,N-dimethylformamide are suitable for use in applications where a fire resistant fibrous material is required. For instance, non-burning fabrics may be formed from the same. As previously indicated, the stabilized fibrous materials are particularly suited for use as intermediates in the production of fibrous graphite products. Such fibrous graphite products may be incorporated in a binder or matrix and serve as a reinforcing medium. The graphite component may accordingly serve as a lightweight load bearing component in high performance structures which find particular utility in the aerospace industry.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for the formation of a cyclized acrylic fibrous material comprising forming a solution of (a) an acrylic polymer which is either an acrylonitrile homopolymer or an acrylonitrile copolymer containing at least about 85 mol percent of acrylonitrile units and up to about 15 mol percent of one or more monovinyl units copolymerized therewith, (b) from about 0.1 to about 10 percent by weight based on the weight of said acrylic polymer of a Lewis acid capable of promoting the cyclization of pendant nitrile groups wherein said Lewis acid is sulfur trioxide or a Lewis acid of the metal halide type and (c) a substantially anhydrous solvent for said acrylic polymer and said Lewis acid which is incapable of decomposing said acrylic polymer and said Lewis acid; said solution containing from about 5 to about 30 percent of acrylic polymer by weight based on the weight of solvent; maintaining said solution at a temperature below about 190° C. until a cyclized acrylic material is formed therein in the absence of an appreciable increase in the viscosity of said solution; and spinning said solution to form a cyclized acrylic fibrous material which is soluble in N,N-dimethylformamide and exhibits no appreciable exothermic reaction when heated to 500° C.

2. A process according to claim 1 in which said acrylic polymer is an acrylonitrile homopolymer.

3. A process according to claim 1 in which said acrylic polymer is an acrylonitrile copolymer which contains at least about 85 mol percent of acrylonitrile units and up to about 15 mol percent of one or more monovinyl units copolymerized therewith.

4. A process according to claim 1 in which said Lewis acid is selected from the group consisting of stannous chloride, stannic chloride, boron fluoride, sulfur trioxide, ferric chloride, titanium tetrachloride, aluminum chloride, and indium dichloride.

5. A process according to claim 1 in which said Lewis acid is stannic chloride.

6. A process according to claim 5 in which said Lewis acid is introduced in the form of a stannic chloride-dimethylformamide complex.

7. A process according to claim 1 in which said solvent is selected from the group consisting of N,N-dimethylformamide, butyrolactone, and dimethylacetamide.

8. A process according to claim 1 in which said acrylic polymer is present in said solution in a concentration of about 10 to about 25 percent by weight.

9. A process according to claim 1 in which said solution is maintained at a temperature of about 140° C. to about 160° C.

10. A process for the formation of a cyclized acrylic fibrous material comprising forming a solution of (a) an acrylic polymer which is either an acrylonitrile homopolymer or an acrylonitrile copolymer containing at least about 85 mol percent of acrylonitrile units and up to about 15 mol percent of one or more monovinyl units copolymerized therewith (b) from about 0.1 to about 10 percent by weight based on the weight of said acrylic polymer of a Lewis acid capable of promoting the cyclization of pendant groups and which is selected from the group consisting of stannous chloride, stannic chloride, boron fluoride, sulfur trioxide, ferric chloride, titanium tetrachloride, aluminum chloride, and indium dichloride, and (c) a substantially anhydrous solvent for said acrylic polymer and said Lewis acid which is incapable of decomposing said acrylic polymer and said Lewis acid; said solution containing from about 5 to about 30 percent of acrylic polymer by weight based on the weight of solvent; maintaining said solution at a temperature of about 100° C. to about 180° C. until a cyclized acrylic material is formed therein in the absence of an appreciable increase in the viscosity of said solution; and spinning said solution to form a cyclized acrylic fibrous material which is soluble in N,N-dimethylformamide and exhibits no appreciable exothermic reaction when heated to 500° C.

11. A process for the formation of a cyclized acrylic fibrous material comprising forming a solution of (a) an acrylic polymer which is either an acrylonitrile homopolymer or an acrylonitrile copolymer containing at least about 85 mol percent of acrylonitrile units and up to about 15 mol percent of one or more monovinyl units copolymerized therewith, (b) from about 0.1 to about 10 percent by weight based on the weight of said acrylic polymer of a Lewis acid capable of promoting the cyclization of pendant nitrile groups and which is selected from the group consisting of stannous chloride, stannic chloride, boro fluoride, sulfur trioxide, ferric chloride, titanium tetrachloride, aluminum chloride and indium dichloride, and (c) a substantially anhydrous solvent for said acrylic polymer and said Lewis acid which is incapable of decomposing said acrylic polymer and said Lewis acid, said solvent being selected from the group consisting of N,N-dimethylformamide, butyrolactone, and dimethylacetamide; said solution containing from about 5 to about 30 percent of acrylic polymer by weight based on the weight of solvent; maintaining said solution at temperature of about 100° C. to about 180° C. until a cyclized acrylic material is formed therein in the absence of an appreciable increase in the viscosity of said solution; and spinning said solution to form a cyclized acrylic fibrous material which is soluble in N,N-dimethylformamide and exhibits no appreciable exothermic reaction when heated to 500° C.

References Cited
UNITED STATES PATENTS

| | | | |
|---|---|---|---|
| 2,913,802 | 11/1959 | Barnett | 23—209.1 F |
| 3,242,000 | 3/1966 | Lynch | 23—209.1 F |
| 3,285,696 | 11/1966 | Tsunada | 264—29 |
| 3,328,333 | 6/1967 | Dannelly et al. | 260—30.4 N |

ALLAN LIEBERMAN, Primary Examiner

U.S. Cl. X.R.

23—209.1 F; 260—30.4 N, 32.6 N, 85.5 B, 85.5 XA, 85.5 HC, 88.7 R, 88.7 B; 264—29, 236

PO-1050
(5/69)

UNITED STATES PATENT OFFICE
CERTIFICATE OF CORRECTION

Patent No. 3,647,770            Dated March 7, 1972

Inventor(s) Klaus H. Gump and Dagobert E. Stuetz

It is certified that error appears in the above-identified patent and that said Letters Patent are hereby corrected as shown below:

Column 5, line 74, delete "13" and insert --18--

Column 6, line 25, delete "15°C." and insert --155°C.--

Signed and sealed this 20th day of June 1972.

(SEAL)
Attest:

EDWARD M. FLETCHER, JR.　　　　　　ROBERT GOTTSCHALK
Attesting Officer　　　　　　　　　　Commissioner of Patents